United States Patent
Decouzon

(10) Patent No.: US 6,698,367 B1
(45) Date of Patent: Mar. 2, 2004

(54) DEVICE FOR DIFFUSING IN THE SOIL VOLATILE TREATING PRODUCTS

(75) Inventor: Daniel L. Decouzon, Plassac (FR)

(73) Assignee: Calliope (FR)

( * ) Notice: Subject to any disclaimer, the term of this patent is extended or adjusted under 35 U.S.C. 154(b) by 0 days.

(21) Appl. No.: 10/110,798
(22) PCT Filed: Oct. 19, 2000
(86) PCT No.: PCT/FR00/02914
§ 371 (c)(1), (2), (4) Date: Jun. 26, 2002
(87) PCT Pub. No.: WO01/28323
PCT Pub. Date: Apr. 26, 2001

(30) Foreign Application Priority Data

Oct. 19, 1999 (FR) .............................. 99 13377

(51) Int. Cl.$^7$ ................................ A01C 23/10
(52) U.S. Cl. ...................................... 111/118
(58) Field of Search ................ 172/720, 739, 172/740; 111/118, 120, 123, 124, 119, 69, 152, 149, 174

(56) References Cited

U.S. PATENT DOCUMENTS

| | | | | |
|---|---|---|---|---|
| 1,667,923 A | * | 5/1928 | Bishop | 111/124 |
| 2,968,266 A | * | 1/1961 | Gustafson | 111/187 |
| 3,322,080 A | * | 5/1967 | Gatzke et al. | 111/188 |
| 3,394,667 A | * | 7/1968 | White | 111/118 |
| 4,337,712 A | | 7/1982 | Michalko | |
| 5,136,954 A | * | 8/1992 | Fetaz et al. | 111/123 |
| 5,240,080 A | * | 8/1993 | Bassett et al. | 172/740 |

FOREIGN PATENT DOCUMENTS

| | | |
|---|---|---|
| EP | 0 018 314 | 10/1980 |
| FR | 1 463 474 | 1/1966 |
| FR | 2 108 645 | 4/1972 |

* cited by examiner

Primary Examiner—Robert E. Pezzuto
(74) Attorney, Agent, or Firm—Anthony J. Casella; Gerald E. Hespos

(57) ABSTRACT

A device is provided for diffusing volatile treatment products into the soil. The device includes a mount frame. Pumps are provided on the mount frame for pumping the products contained in storage compartments. Feeding circuits are arranged with the pumps and connect the storage compartments to a manifold. A diffusing tube is formed on a coulter of a tractor and is connected to the outlet of the manifold to diffuse in the soil a gas stream derived from the reaction of the treatment products when the coulter is introduced into the soil.

12 Claims, 4 Drawing Sheets

DEVICE FOR DIFFUSING IN THE SOIL VOLATILE TREATING PRODUCTS

BACKGROUND OF THE INVENTION

The present invention relates to a device for diffusing in the soil volatile treatment products, in particular multi-component products.

Phytosanitary treatment products in the form of granules are known that are dispersed in the soil by ploughing in, or burial, and which, by gradually reacting in the presence of the moisture of the soil, exert their action upon the organisms to be eliminated.

Such products are generally aggressive, but it is relatively easy to handle them in solid form.

In the case of other products, or so-called products to be applied by fumigation, it is necessary to turn up the soil, discharge a stream of gas at the bottom of a furrow and cover the furrow with earth immediately afterwards. Such an application entails real difficulties.

For this kind of application, there is provided a frame mounted on the three-point linkage of a tractor. This chassis is provided with coulters designed to inject the treatment gases into the soil. However, these coulters do not penetrate the soil deeply and they have to be close to one another to ensure correct treatment. As a result, considerable clogging with roots occurs and the user has to raise the linkage in order to clear the coulters of the accumulated vegetation, which can give rise to treatment gas fumes and is not satisfactory. If the user takes the time to carry out the manoeuvre correctly, that is to say if he waits for the gas to cease flowing, he wastes considerable time.

In addition, penetration depth is irregular, and injection at the correct depth is thus not always possible, leading to application inconsistent with specifications.

The injection systems are also known to use compressed air pumps which work at constant pressure and delivery rates. These systems are not, however, suitable as they produce dosages that are not proportional, which leads to dosages that are either excessive or insufficient. Moreover, they consume unnecessary quantities of products that are relatively expensive since they are sophisticated and highly technical.

Existing diffusion means further have the drawback of being corroded by products that are particularly aggressive. It is thus conceivable that a pump may be provided that affords good resistance to one of the treatment products but generally poor resistance to others. Changing over pumps according to the products used cannot, however, be contemplated. Thus, users are obliged to replace and service the pumps very frequently, which increases treatment costs accordingly.

New products resulting from in-depth research that are commercially available offer quite clear advantages, in particular as to treatment efficiency. Mention can be made, in particular, of the one marketed by the Calliope company under the name of "Enzone".

On the other hand, these products are more difficult to handle. Indeed, while the solvent-dispersant required is very simple, since it is water, the active principle, on the other hand, is hydro-reactive and generates a gaseous product immediately after being brought into contact with water. It is thus not possible to prepare the mixture in advance as a pressure vessel would be needed. In addition, the efficiency of such products is often maximal at the time of reaction and decreases in time. The products need to be injected simultaneously in situ, as the treatment progresses, that is to say into the soil.

SUMMARY OF THE INVENTION

The present invention provides a device which permits the diffusion of such products including at least two inter-reactive compounds, which precludes any risk of pressurising the on-board storage tank, which prevents losses and approximate dosages by operating in DPA mode, i.e. at a delivery rate proportional to advance, while, at the same time, enabling the volume diffused per unit of surface to be adjusted very simply, which is highly reliable thanks to the combination of mechanical means which are themselves simple, hence reliable, which can use different products with the same pump, which diffuses the gas stream continuously and at the right depth in the soil, which prevents any clogging and the need to raise the frame, and which is designed to be connected also to the three-point linkage of a tractor like the majority of known agricultural machines.

For this purpose, the device for diffusing volatile treatment products in the soil, in particular at least two inter-reactive products for application by fumigation, which is the object of the present invention, includes a frame, connecting means for connecting the frame to the three-point linkage of a tractor, and means for storing the products, and is characterised in that it includes, installed on the frame, means for pumping the products contained in the storage means, supply circuits in which are disposed the pumping means and which connect the storage means to a manifold having at least two inputs and one output, and diffusion means borne by at least one coulter and connected to the output of the manifold to diffuse in the soil, when the coulter is introduced into the latter, a gas stream resulting from the reaction of the inter-reactive products.

Preferably, the diffusion means include a common tube which is disposed downstream of the coulter, parallel to the edge and over its entire height, and the open lower end of which emerges in the area of the heel of said coulter.

As to the coulter, it preferably includes subsoil ploughing wings at its lower end.

According to one particular feature of the invention, the pumping means include one pump per product and are preferably constituted by peristaltic pumps.

The diffusion device according to the invention further includes means for travelling over the soil and means for actuating the peristaltic pumps when the travelling means are rotated, so that the delivery rate of said pumps is proportional to advance.

Preferably, the travelling means include at least one free running wheel rotatably mounted on the end of a rocker arm capable of pivoting on the frame about a pin, a return member being interposed between the frame and the rocker arm to press the free running wheel against the soil.

Preferably also, the means for driving the peristaltic pumps include a chain interposed between a driving plate rotationally integral with the wheel and a driven plate rotationally integral with a shaft designed to drive the pumps, as well as a chain adjuster to compensate for variations in the length of the chain.

Furthermore, the diffusion device according to the invention can advantageously include a roller located rearwards of the coulter and designed to compact the soil and set the furrow produced by the coulter as the tractor moves.

In the form of embodiment that has just been described, there are thus provided two supply circuits connecting two treatment product-storing means to a common manifold to which the diffusing means are connected, these circuits being completely independent of one another and ensuring a flow rate proportional to the advance of the tractor.

According to an alternative embodiment, the diffusion device according to the invention includes a radar for detecting the speed of advance of the tractor; a hydraulic circuit including an oil tank, at least one pump, two hydraulic motors for driving the pumping means and two proportional valves to supply the hydraulic motors; sensors associated with the pumping means for detecting the delivery rates of the latter; and a computer to which the radar and the delivery rate sensors are coupled, and which is designed to drive the proportional valves according to the signals received from said radar and said sensors in order to determine the quantities of inter-reactive products to be delivered by the pumping means to the diffusion means.

Thanks to this combination of arrangements, it is possible to diffuse in the soil quantities of treatment products that are far more precise.

To facilitate the user's task, the computer is preferably installed on the tractor.

Thus, the user, by applying simple keystrokes to the keyboard, can change the delivery rates of the pumping means according to the treatment to be carried out.

The diffusion device according to the invention can further advantageously include a switch to interrupt the operation of the pumping means when the coulter is withdrawn from the soil and to command the operation of said pumping means when the coulter penetrates the soil.

Thus, when the tractor reaches one of the ends of a field to be treated and the user withdraws the coulter from the soil by raising the diffusion device by means of the three-point linkage, the treatment products cease to be directed towards the diffusion means, which prevents the gas stream from being emitted into the atmosphere.

Of course, the switch will once more cause the pumping means to operate as soon as the user lowers the diffusion device to introduce the coulter into the soil.

BRIEF DESCRIPTION OF THE DRAWINGS

The present invention will now be described in detail with reference to the annexed drawings, which represent two preferred, but non-limitative forms of embodiment. In these drawings.

DETAILED DESCRIPTION OF THE INVENTION

Figure 1:
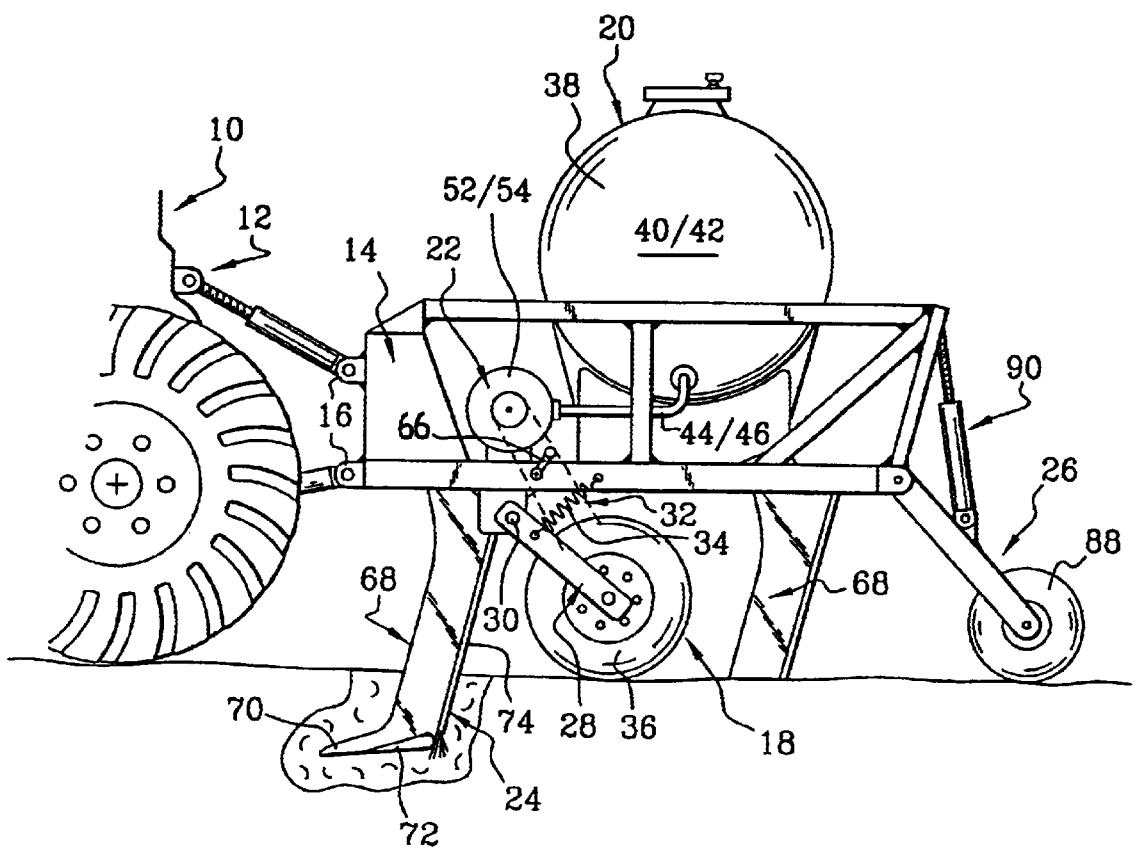
FIG. 1 is a lateral elevation view of a device according to the present invention, during operation.

FIG. 1 shows the rear of a tractor 10 equipped with a three-point linkage 12.

The device according to the present invention includes a frame 14 which is equipped with means 16 ensuring its connection to the three-point linkage 12. This frame also comprises travelling means 18, means 20 for storing treatment products, pumping means 22, diffusion means 24 and compacting means 26.

Frame 14 advantageously has a rigid tubular structure, known per se, to ensure that the whole is of sufficient mechanical strength.

Travelling means 18 are mounted on a transverse beam. These travelling means include two rocker arms 28, mounted on either side of the frame and pivoting about a pin 30. In the case of each rocker arm, a return member 32, such as a compression spring 34, biases the end of this arm towards the ground. Each rocker arm bears, at its end opposed to pin 30, a free running wheel 36, of the agricultural machine type, in contact with the ground.

Storage means 20 include a closed tank 38 provided with as many compartments as there are different products to be kept. In the case in point, there is provided a tank with two compartments 40, 42, shown in FIG. 3. These compartments are respectively equipped with tapping means 44 and 46, advantageously located beneath the tank to enable the corresponding pump to be gravity fed.

A separate tank for each product can also be provided. Thus, the tank containing one of the products could advantageously be disposed at the front of the tractor, which would, at the same time, ensure better balance of the linkage.

Pumping means 22 are interposed on circuits 48, 50 extending from tapping means 44, 46. These pumping means include two pumps 52, 54 of the peristaltic type. It suffices to choose from among existing hoses those that are best suited to the products for pumping and that are sufficiently flexible to be pinched by the rotary cores of the peristaltic pumps for a sufficient number of cycles. The two hoses can be different while the pumps remain unchanged. These pumps are unaffected by the fluid and cannot be deteriorated through the effects of corrosion as there is no direct contact between the rotating members and the fluids conveyed.

The pumps have a delivery rate that depends, essentially, upon the inside diameter of the hoses and upon the rotational frequency of their cores.

The pumps according to the present invention are arranged to be of the "DPA" type, i.e. Delivery Proportional to Advance. For this purpose, the pumps are connected to a shaft on one of wheels 36 by drive means 56.

Figure 3:
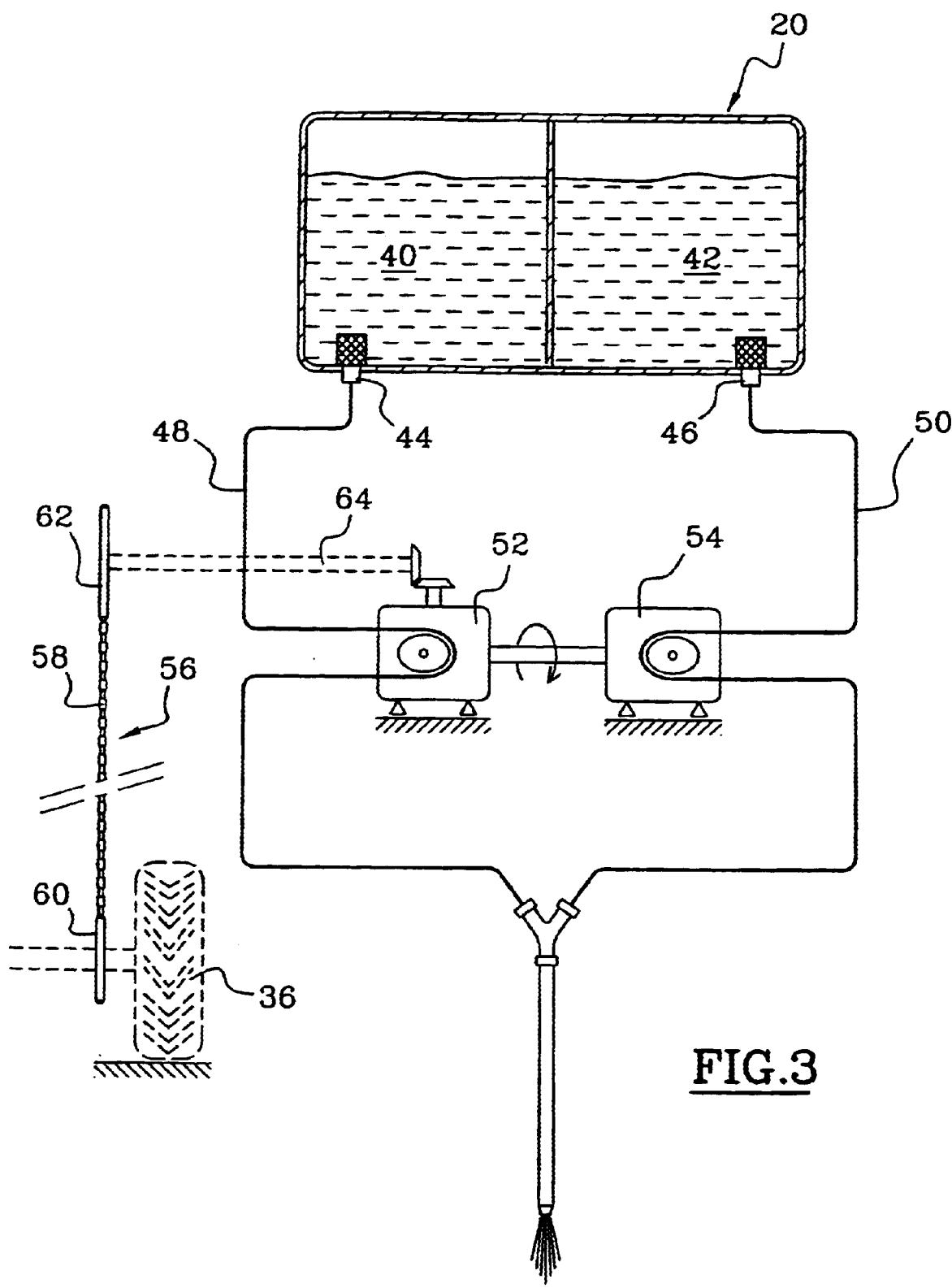
FIG. 3 is a schematic view of the circuit travelled by the treatment products in the device according to the present invention.

These means are diagrammatically represented in FIG. 3. A chain 58 is interposed between a driving plate 60, rotationally integral with wheel 36, and a driven plate 62, rotationally integral with shaft 64 driving the pumps. A chain adjuster 66, shown in FIG. 1, compensates for the variations in length of the chain during the movements of the rocker arm.

It should be noted that the speed of rotation of the pumps can be changed simply by replacing one of the plates, which leads to a change in drive ratio, hence in the delivery rate of the pumps, for the same hose diameter and the same speed of advance of the tractor/frame assembly. This makes it possible to adjust the flow rate of the treatment product dispensed per surface unit.

The delivery rate of one of the pumps can be set independently of that of the other, without changing hoses. It suffices to provide either for an independent drive assembly co-operating with the second wheel, or secondary drives independent of each of the pumps, also including a chain/plate assembly operating from a main drive shaft.

The pumps are interposed between the means 20 provided for storing the products and the diffusion means 24 that include a diffuser 74.

Diffusion means 24 include at least one coulter 68 and, more generally, two rows of coulters, one including two coulters and the other three, disposed so as to be staggered to permit treatment of a suitable surface area, without this known disposition being limitative. The arrangement must be adapted to suit the surfaces to be treated.

The coulters can be spaced sufficiently apart to leave a substantial clearance and allow through the roots without causing clogging, as will be more readily understood upon studying the implementation stages.

Figure 2:
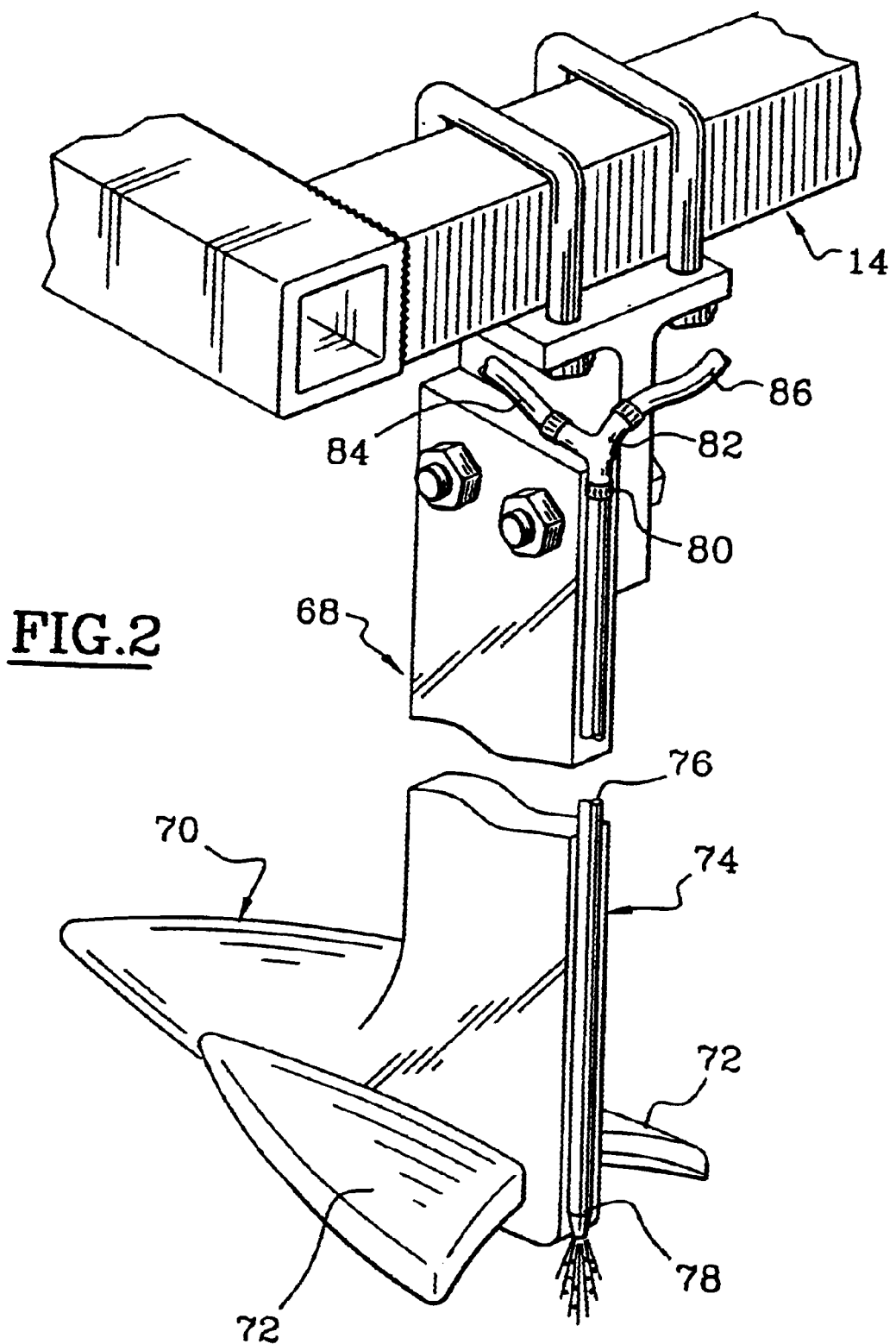
FIG. 2 is a detailed perspective view of a coulter with its diffusion system.

Each coulter, as shown in FIG. 2, is mounted on frame 14 by means of suitable fixing means, this being effected in a known manner. Each coulter includes, at its lower end, a tooth 70 comprising subsoil ploughing wings 72 designed to raise the soil on either side of the coulter in order to ensure better diffusion of the product.

Diffuser 74, properly speaking, includes a single common tube 76 which is disposed downstream of the coulter, parallel to the edge and over its entire height, and the open lower end 78 of which emerges in the area of the heel of said coulter.

At its upper end 80, diffuser 74 comprises a manifold having two inputs 82 which receives the two hoses 84, 86 corresponding to the two reactive products. These products are thus mixed immediately prior to diffusion, at the top of tube 76, and delivered at the bottom thereof.

Compacting means 26 include a roller 88, preferably made of rubber, of the type marketed under the name of "Farm-Flex". This roller is rendered integral with the frame by adjusting means 90 making it possible to adjust the attitude of the frame in relation to the ground, hence to adjust the "gauge", that is to say the penetration of the soil by the coulters. The profiles of the teeth of the coulters tend to cause the latter to sink in, but roller 88 prevents this from occurring. In addition, through this reaction effect, the roller, which is pressed onto the soil, compacts it, thus limiting any leakage of gaseous treatment products.

The different phases of treatment will now be discussed.

The user fills tanks 40, 42, one with a reactive product such as "Enzone", and the other with water, to take a precise example. It suffices to provide a sealingly connected hose and to pressurise the recipient containing this product. The liquid product is then delivered into the corresponding tank.

The container of water is filled by connecting it to the general supply circuit, through simple mains pressure.

The products are diluted such that the dosages, for ease of use, are 50/50.

The frame assembly having been raised using three-point linkage 12 of the tractor, the user proceeds to the treatment site.

He positions the tractor and lowers the linkage. This operation presses furrowing and compacting roller 88 against the soil, as well as free running wheel 36, the action on the ground of which is controlled by spring 34.

When the tractor moves forward, the coulters penetrate the soil, while each wheel 36 travels over it and thus drives pumps 52, 54, which deliver the products according to the speed of advance of the tractor. It should be noted that gravity feed enables the diffuser to be fed as soon as the wheels effect their first rotations since the pumps deliver the products immediately they are rotated. The no-load pumping stage is thus avoided.

The products come into contact with one another at two-input manifold 82, where they begin their reaction, which creates a gas flow that diffuses at the lower part of the coulters, in the part of the soil worked by tooth 70 and wings 72 of the coulters.

By way of example, the coulters can be spaced 35 cm apart and form two rows, of two and three coulters, respectively, offset and introduced to a depth of 35 to 40 cm into the soil.

This depth is set by compacting roller 88, which also determines the furrow. After the product has been diffused, this roller compacts the soil that has been previously aerated and, by thus limiting losses of the gaseous product, permits better treatment efficiency.

At the end of the treatment zone, the user raises three-point linkage 12, which halts rotation of wheel 36, hence the operation of pumps 52, 54.

This device is particularly suitable for inter-reactive products, but it can, of course, be used with non-inter-reactive products.

Figure 4:
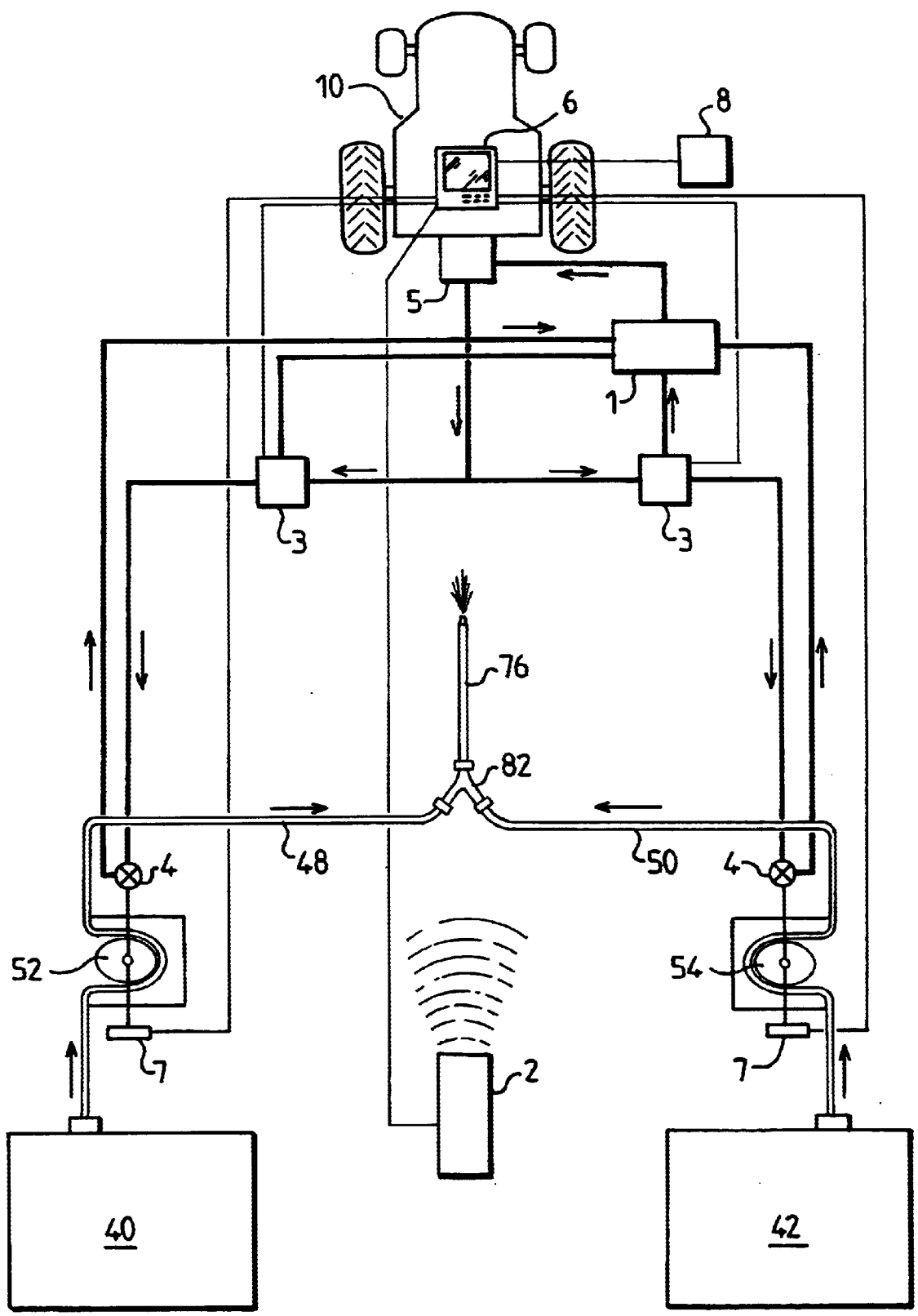
FIG. 4 is a schematic view of a particular control assembly provided on the diffusion device according to the invention to actuate the peristaltic

With reference now to FIG. 4, it will be noted that this figure shows a number of members and elements featuring in FIGS. 1 to 3. These are, in fact, tractor 10, compartments 40 and 42 containing the treatment products, peristaltic pumps 52 and 54, supply circuits 48 and 50, two-input manifold 82 and diffusion tube 76.

The control assembly designed to actuate the two peristaltic pumps in a controlled manner first of all comprises a radar 2, designed to detect the speed of advance of tractor 10; a hydraulic circuit including an oil tank 5, at least one pump 1, two hydraulic motors 4 for driving pumps 52, 54, and two proportional valves 3 for supplying hydraulic motors 4 with the pressurised oil that they need in order to drive them.

The control assembly also includes two sensors 7, associated with pumps 52 and 54, respectively, and designed to detect the delivery rates of the latter, and a computer 6 to which radar 2 and sensors 7 are coupled, and which is designed to drive proportional valves 3 in accordance with the signals outputted by said radar and said sensors.

A number of parameters are fed into computer 6.

These are constant parameters such as the working width of the diffusion device, the volumes of products to be diffused per acre, the delivery rate of the pumps in 'T/l', "work in one $360^{th}$ of a revolution", and the instantaneous surface area treated, as well as variable parameters such as the speed of advance detected by radar 2 and the instantaneous delivery rates of pumps 52, 54.

As the tractor advances, computer 6 calculates, as a function of the speed detected by radar 2, the instantaneous surface area treated, the volumes of products that have to be delivered by pumps 52, 54 and controls the opening or closing of valves 3 on the basis of the flow rates actually detected by sensors 7.

The control assembly shown in FIG. 4 enables pumps 52, 54 to be actuated separately. Their delivery rates can thus be changed independently of one another simply via keystrokes on the keyboard of computer 6.

To facilitate the user's action, it is desirable to install the computer in the driver's cab of the tractor.

Finally, it should be pointed out that a switch 8 is provided to interrupt the operation of pumps 52, 54 when coulter 68 (shown in FIGS. 1 and 2) is withdrawn from the soil through the action of three-point linkage 12 of the tractor, and to command the operation of these pumps when coulter 68 is once again driven into the earth through the action of the three-point linkage.

What is claimed is:

1. Device for diffusing in soil two at least two inter-reactive products for application by fumigation, including a frame (14) designed to be connected to a three-point linkage (12) of a tractor, characterised in that the device includes, installed on the frame (14), two compartments (40, 42) for storing the inter-reactive products, pumping means (22) for pumping said products contained in the compartments (40, 42), supply circuits (48, 50) in which are disposed the pumping means (22) and which connect the compartments (40, 42) to a supply member (82) having at least two inputs and one output, a tube (76) borne by at least one coulter (68) including subsoil ploughing wings (72) at a lower end of the coulter (68), the tube (76) being connected to the output of the supply member (82) to diffuse in the soil; when the coulter is introduced into the soil, a gas stream resulting from a reaction of the inter-reactive products, a free running wheel (36) in contact with the soil and which drives a driving means (56) for actuating the pumping means when the free running wheel (36) is driven in rotation, and a roller (88) for compacting the soil and setting a furrow produced by the coulter (68) as the tractor moves, the roller being located rearwards of the coulter (68), a radar (2) for detecting a speed of advance of the tractor, a hydraulic circuit having an oil tank (5), at least one hydraulic circuit pump (1), two hydraulic motors (4) for driving the pumping means (22) and two proportional valves (3) to supply the hydraulic motors; sensors (7) associated with the pumping means for detecting delivery rates of the pumping means; and a computer (6) to which the radar (2) and the delivery rate sensors (7) are coupled, and which is design to drive the proportional valves (3) according to the signals received from said radar and said sensor to determine quantities of inter-reactive products to be delivered by the pumping means (22) to the diffusion means (24).

2. Diffusion device according to claim 1, characterised in that the tube (76) is disposed downstream of the coulter (68) and extends parallel to an edge of the coulter (68) and extending over an entire height of the coulter (68), a lower end (78) of the tube being open and emerging in an area of a heel of said coulter.

3. Diffusion device according to claim 1, characterised in that the pumping means (22) comprise peristaltic pumps.

4. Diffusion device according to claim 1, characterised in that the free running wheel (36) is rotatably mounted on an end of a rocker arm (28) capable of pivoting on the frame (14) about a pin (30), a return member (32) being interposed between the frame and the rocker arm to press the wheel so that the free running wheel (36) bears against the soil.

5. Diffusion device according to claim 3, characterised in that the driving means (56) for driving the pumps (52, 54) include a chain (58) interposed between a driving plate (60) rotationally integral with the free running wheel (36) and a driven plate (62) rotationally integral with a shaft (64) to drive the pumps, and a chain adjuster (66) to compensate for variations in length of the chain.

6. Device for diffusing in the soil at least two inter-reactive products for application by fumigation, including a frame (14) designed to be connected to a three-point linkage (12) of a tractor, storage means (40, 42) for storing the inter-reactive products, at least one coulter (68) bearing a tube (76), and supply circuits (48, 50) in which are disposed pumping means (22), the supply circuit (48, 50) connecting the storage means (40, 42) to the tube (76) in order for the tube to diffuse in the soil, when the coulter (68) is introduced into the soil, a gas stream resulting from a reaction of the inter-reaction products; characterized in that it further includes;

a radar (2) for detecting a speed of advance of the tractor;

a hydraulic circuit including an oil tank (5), at least one hydraulic circuit pump (1), two hydraulic motors (4) for driving the pumping means (22) and two proportional valves (3) to supply the hydraulic motors;

delivery rate sensors (7) associated with the pumping means (22) for detecting delivery rates of the pumping means (22);

a computer (6) coupled to the radar (2) and the delivery rate sensors (7) for driving the proportional valves (3) according to signals received from said radar and said delivery rate sensors (7) to determine quantities of inter-reactive products to be delivered to the tube (76) by the pumping means (22);

a free running wheel (36) in contact with the soil and driving means (56) actuating the pumping means (22) when the driving means (56) is driven in rotation; and a roller (88) for compacting the soil and setting a furrow produced by the coulter (68) as the tractor moves, the roller being located rearwards of the coulter (68).

7. Diffusion device according to claim 6, characterised in that the computer (6) is installed on the tractor.

8. Diffusion device according to claim 6, characterised in that the device includes a switch (8) to interrupt operation of the pumping means (22) when the coulter (68) is withdrawn from the soil and to command the operation of said pumping means when the coulter penetrates the soil.

9. Diffusion device according to claim 6, characterised in that the pumping means are peristaltic pumps.

10. Diffusion device according to claim 6, characterised in that the free running wheel (36) is rotatably mounted on the end of a rocker arm (28) capable of pivoting on the frame (14) about a pin (30), a return member (32) being interposed between the frame and the rocker arm to press the wheel against the soil.

11. Diffusion device according to claim 6, characterised in that the driving means (56) for driving the pumps (52, 54) include a chain (58) interposed between a driving plate (60) rotationally integral with the free running wheel (36) and a driven plate (62) rotationally integral with a shaft (64) designed to drive the pumps, as well as a chain adjuster (66) to compensate for variations in the length of the chain.

12. Diffusion device according to claim 6, characterised in that the tube (76) is disposed downstream of the coulter (68) and extends parallel to an edge of the coulter (68) and extending over an entire height thereof of the coulter (68), a lower end (78) of the tube being open and emerging in an area of a heel of said coulter.

* * * * *